United States Patent
Hotter

(12) 
(10) Patent No.: US 6,415,738 B1
(45) Date of Patent: Jul. 9, 2002

(54) SANITARY ENCLOSURE FOR AN ANIMAL LITTER BOX

(76) Inventor: Joseph Hotter, 112 Alison La., Archdale, NC (US) 27263

( * ) Notice: Subject to any disclaimer, the term of this patent is extended or adjusted under 35 U.S.C. 154(b) by 0 days.

(21) Appl. No.: 09/503,874

(22) Filed: Feb. 14, 2000

(51) Int. Cl.[7] .............................................. A01K 29/00
(52) U.S. Cl. .................................................... 119/165
(58) Field of Search ................................ 119/165, 166, 119/167, 168, 169, 622

(56) References Cited

U.S. PATENT DOCUMENTS

| | | | |
|---|---|---|---|
| 3,618,568 A | 11/1971 | Breeden | 119/165 |
| 4,548,160 A * | 10/1985 | Feitelson | 119/168 |
| 4,646,684 A * | 3/1987 | Embry | 119/167 |
| 4,766,845 A * | 8/1988 | Bavas | 119/165 |
| 4,838,202 A * | 6/1989 | Neu | 119/165 |
| 4,858,561 A * | 8/1989 | Springer | 119/165 |
| 4,926,794 A * | 5/1990 | Yamamoto | 119/165 |
| 4,972,800 A * | 11/1990 | Bennett et al. | 119/166 |
| 5,092,277 A * | 3/1992 | Baillie et al. | 119/165 |
| 5,195,464 A * | 3/1993 | Mutter | 119/165 |
| 5,218,930 A * | 6/1993 | Casmira | 119/165 |
| 5,220,885 A * | 6/1993 | Goetz | 119/165 |
| 5,367,984 A * | 11/1994 | Purnell | 119/166 |
| 5,471,950 A * | 12/1995 | White | 119/165 |
| 5,572,950 A * | 11/1996 | O'Rourke et al. | 119/165 |
| 5,590,623 A * | 1/1997 | Toole et al. | 119/165 |
| D383,262 S | 9/1997 | Benwell | 119/165 |
| 5,676,090 A | 10/1997 | Cannady, Jr. | 119/165 |
| 5,769,026 A | 6/1998 | Kohn | 119/165 |
| 5,806,461 A | 9/1998 | Kiera | 119/165 |
| 5,887,546 A | 3/1999 | Gruel | 119/165 |
| 6,109,211 A | 8/2000 | Tomlinson | 119/165 |
| 6,176,201 B1 | 1/2001 | Fields | 119/165 |

OTHER PUBLICATIONS

US 4,813,276, 03/1989, Kaufman et al. (withdrawn)
Drs. Foster & Smith Litter Box Benches, date unknown.*

* cited by examiner

*Primary Examiner*—Charles T. Jordan
*Assistant Examiner*—Elizabeth Shaw

(57) ABSTRACT

A sanitary enclosure for an animal litter box that includes a top wall, a bottom wall and peripheral walls forming an enclosed space for accommodating a variety of standard litter boxes or trays. An aperture is located in one of the peripheral walls to permit an animal to enter and exit the enclosed space. Space suitable for the placement of a pad for cleaning the animal's paws is located between the aperture and the litter box. A removable or openable wall is provided to enable the litter box to be readily removed and replaced. The sanitary enclosure facilitates clean up and litter replacement, while minimizing odors and stains caused by tracking of soiled liter out of the litter box.

16 Claims, 2 Drawing Sheets

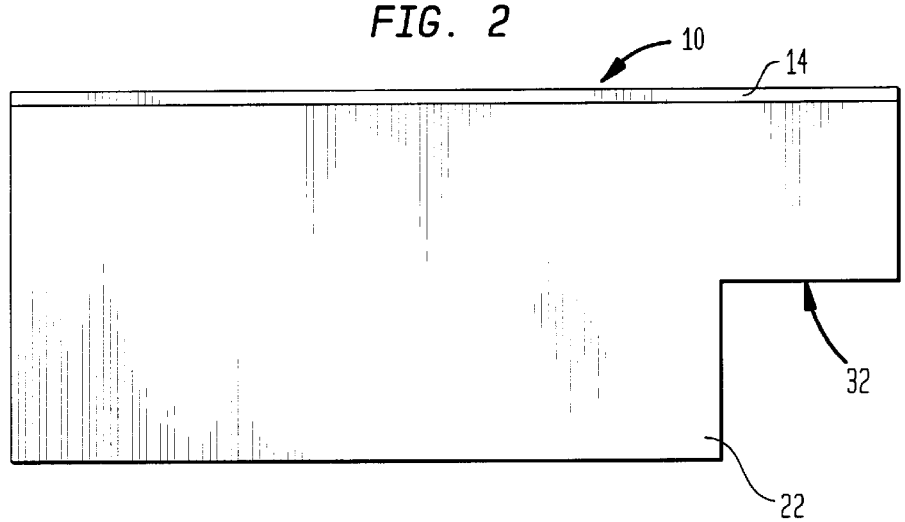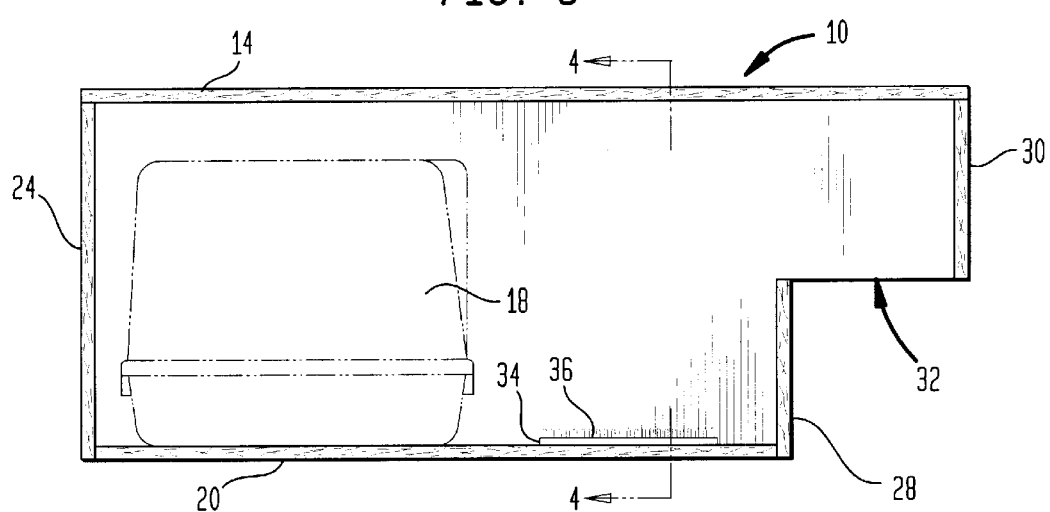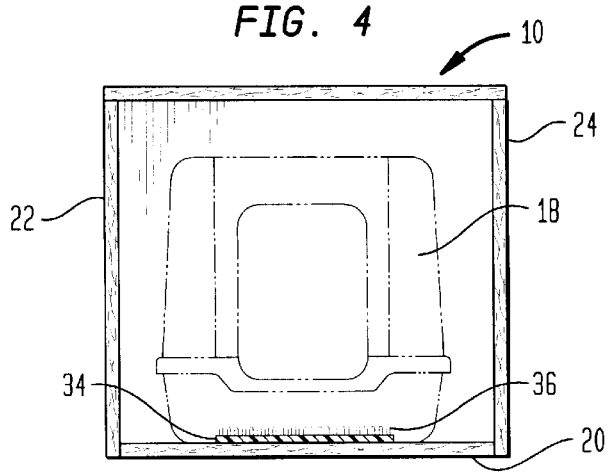

SANITARY ENCLOSURE FOR AN ANIMAL LITTER BOX

BACKGROUND AND SUMMARY OF THE INVENTION

The present invention is directed to an enclosure for an animal litter box and particularly to an enclosure for a litter box that minimizes odors and contains stray litter and stains.

Pet ownership provides a great deal of joy to many people, however dealing with litter boxes is hardly a joyous experience. Litter boxes cause pet owners a number of problems, particularly when the litter box is placed indoors. Among the problems are odors, as well as the tracking of stains and loose litter by the animal when exiting the box. Furthermore, the space used by the litter box is effectively lost as storage space. While a number of new litter box designs have become available in the past few years, these boxes have not completely overcome the problems of odors and litter tracking. These problems lead many pet owners to keep the litter box outdoors, which leads to other problems such as the need to provide a way for the pet to enter the house, a solution which is not feasible for apartment dwellers.

The prior art litter boxes are exemplified by the following U.S. patents:

| U.S. Pat. No. | Inventor | Issue Date |
| --- | --- | --- |
| 5,572,950 | O'Rourke et al | November 12, 1996 |
| 5,590,623 | Toole et al. | January 7, 1997 |
| 5,195,464 | Mutter | March 23, 1993 |
| 5,218,930 | Casmira | June 15, 1993 |
| 4,838,202 | Nen | June 13, 1989 |
| 4,858,561 | Springer | August 22, 1989 |
| 5,471,950 | White | December 5, 1995 |
| 5,092,277 | Baillie et al. | March 3, 1992 |
| 4,813,376 | Kaufman et al. | March 21, 1989 |
| 4,766,845 | Bavas | August 30, 1988 |
| 4,548,160 | Feitelson | October 22, 1985 |
| 4,972,800 | Bennett et al. | November 27, 1990 |
| 4,926,794 | Yamamoto | May 22, 1990 |
| 5,220,885 | Goetz | June 22, 1993 |
| 4,646,684 | Embry | March 3, 1987 |
| 5,367,984 | Purnell | November 29, 1994 |

The present invention is directed to a sanitary enclosure for an animal litter box that provides numerous benefits over the prior art, these benefits include:

1) Undesirable odors are greatly minimized as any odors emanating from the soiled litter will predominately remain within the enclosure and will not escape into the home or apartment where the enclosure is located.
2) The enclosure contains space suitable for the placement of a pad for cleaning the animal's paws as it exits the litter box, but before it exits the enclosure, so that stains and the tracking of loose litter by the animal are greatly reduced.
3) Storage or working space in the house or apartment will not be lost as items can be placed on top of the enclosure without concern for potential contact and contamination by soiled litter.
4) As the vast majority of litter particles tracked out of the litter box are contained within the enclosure, clean up time is minimized and the area around the enclosure remains more sanitary.
5) As odors and stains are greatly reduced, indoor placement of the litter box becomes feasible in many situations where it was not previously feasible.
6) Litter boxes of almost all current types may be used with the present sanitary enclosure, which minimizes additional costs by eliminating the need to purchase a new litter box.

To these ends, the present invention is directed to a sanitary enclosure for an animal litter box that includes a top wall, a bottom wall and peripheral walls forming an enclosed space for accommodating a variety of standard litter boxes or trays. An aperture is located in one of the peripheral walls to permit an animal to enter and exit the enclosed space. Space adequate for the placement of a pad for cleaning the animal's paws is located between the aperture and the litter box. A removable or openable wall is provide to enable the litter box to be readily removed and replaced. The sanitary enclosure facilitates clean up and litter replacement while greatly reducing odors and stains caused by the tracking of litter out of the litter box.

BRIEF DESCRIPTION OF THE DRAWINGS

For a better understanding of the invention, reference is made to the following drawings which are to be taken in conjunction with the detailed description to follow in which:

FIG. 2 is a side view of the sanitary enclosure for an animal litter box of the present invention.

FIG. 3 is a sectional view of the sanitary enclosure for an animal litter box of the present invention.

FIG. 4 is a sectional view of the sanitary enclosure for an animal litter box of the present invention taken along line 4—4 of FIG. 3.

DESCRIPTION OF THE PREFERRED EMBODIMENTS

Figure 1:
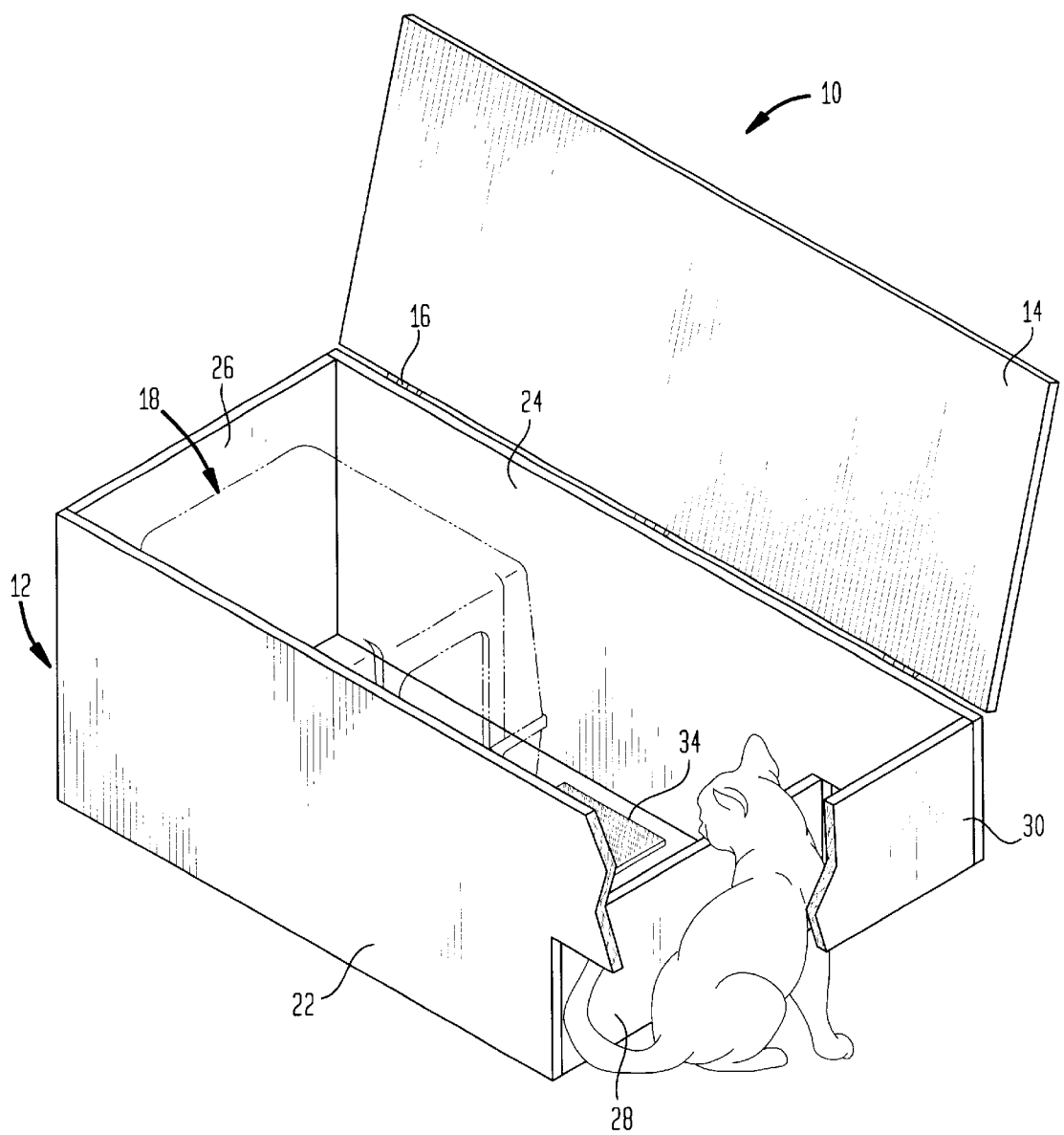
FIG. 1 is perspective view of a sanitary enclosure for an animal litter box constructed in accordance with the present invention showing the hinged cover in an opened position.

FIG. 1 is perspective view of a sanitary animal litter box enclosure 10 which includes a container portion 12 and cover portion 14 which is connected by a hinge 16 to container portion 12. Container portion 12 is sized so a standard litter box 18 may be placed therein and cover portion closed thereon. Container portion 12 includes a bottom wall 20, a front wall 22, a rear wall 24, a side wall 26 and a pair of spaced side walls 28,30 which form an entrance/exit opening 32 for an animal. The space along bottom wall 20 between litter box 18 and opening 32 is designed for placement of a removable pad 34 which serves to clean the paws of an animal as it exits litter box 18 and proceeds to opening 32 to exit enclosure 10.

As is best seen in FIGS. 2–4, the upper portion of front wall 22 and rear wall 24 are longer than the lower portions, with side wall 28 joined to the lower portions and side wall 30 joined to the upper portions, opening 32 is formed between walls 28, 30 and lies in a horizontal plane. Opening 32 is thus hidden and is also covered by the overhanging upper portions of walls 22 and 24 which also serves to minimize the escape of odors and debris from the interior of enclosure 10. Paw cleaning pad 34 is disposable on bottom wall 20 between opening 32 and litter box 18 so that the animal must walk across it as it exits the litter box. Pad 34 can be molded from rubber or plastic and includes a multiplicity of upstanding flexible bristles or raised grooves 36 (and is similar to certain home welcome mats or astroturf) that will gently contact and open the paws of the animal as it walks across pad 34 to remove any litter clinging to the paws so that the litter will not be tracked out of enclosure 10.

In another aspect of the invention it is seen that spaced vertical walls 28,30 act as baffles to define a serpentine entranceway (or chute) for the animal to enter the enclosed space vertically through horizontally disposed aperture 32. This requires the animal to first climb up then down when entering and exiting enclosure 10, is further assures a thorough cleaning of the paws, while also promoting the containment of stray litter. Furthermore, as aperture 32 lies beneath cover portion 14 the entrance way is out of sight and further assures the retention of odors within the enclosed space.

In use, cover portion 14 is opened to permit the user to place litter box 18 within enclosure 10 at the far end. The litter box may be of any of the standard types such as the enclosed box 18 or simply a litter tray. After litter box 18 is full, cover portion 14 is opened to permit removal and replacement of box 18 and cleaning of enclosure 10. During use, cover portion 14 can be used as a shelf to store materials, thus saving house space. Cover portion 14 could be hinged to any of the peripheral walls and, rather than being hinged, could also be completely removable. Also the enclosure could be constructed without a bottom wall with the floor of the house or apartment serving as the surface for placement of litter box 18 and cleaning pad 34.

As shown herein the sanitary enclosure for animal litter box can readily be constructed from individual cut flat sheets of any suitable material such as wood, plywood, metal or plastic. Alternatively, the container and cover portions of the sanitary enclosure for an animal litter box can be easily molded or thermoformed as a unit from many suitable rubbers, plastics and polymers such as polyethylene, polystyrene, polycarbonates, PET, PBT etc. which can facilitate cleaning. A holder for litter and/or the paw cleaning pad could also be molded integrally with the container portion of the enclosure. The paw cleaning pad may also be purchased separately. The size of the enclosure is not critical as long as it is capable of holding conventional litter boxes and paw cleaning pads.

The invention has been described with respect to preferred embodiments. However, a those skilled in the art will recognize, modifications and variations in the specific details which have been described and illustrated may be resorted to without departing from the spirit and scope of the invention as defined in the appended claims.

What is claimed is:

1. A sanitary enclosure for an animal litter box comprising:
   a) a bottom wall;
   b) a top wall;
   c) a plurality of peripheral walls joining said top and bottom walls to form an enclosed space;
   d) an aperture of sufficient size, disposed in one of said side walls to permit an animal to enter the enclosed space defined by the top, bottom, and peripheral walls wherein the aperture lies in a horizontal plane and is located between spaced vertical side walls;
   e) means for accommodating a litter box on said bottom wall within said enclosed space;
   f) means for accommodating a paw cleaning mat disposed on said bottom wall, proximate to said aperture, to clean the paws of an animal as it exits the enclosed space; and
   g) at least one of said top, bottom, and peripheral walls being openable so as to permit access to said litter box.

2. The sanitary enclosure for an animal litter box as claimed in claim 1 wherein said top wall is hinged to at least one of said peripheral walls.

3. The sanitary enclosure for an animal litter box as claimed in claim 1 wherein the paw cleaning means comprise a multiplicity of upstanding flexible bristles.

4. The sanitary enclosure for an animal litter box as claimed in claim 1 wherein the top, bottom and peripheral walls comprise flat panels.

5. The sanitary enclosure for an animal litter box as claimed in claim 1 wherein the bottom and peripheral walls are molded as a unit.

6. The sanitary enclosure for an animal litter box as claimed in claim 1 wherein the bottom wall and the litter box are molded as a unit.

7. A sanitary enclosure for an animal litter box comprising:
   (a) a bottom wall;
   (b) a top wall;
   (c) a plurality of peripheral walls joining said top and bottom walls to form an enclosed space;
   (d) an aperture of sufficient size, disposed in one of said side walls to permit an animal to enter the enclosed space defined by the top, bottom, and peripheral walls wherein the top wall extends beyond the aperture;
   (e) means for accommodating a litter box on said bottom wall within said enclosed space;
   (f) means for accommodating a paw cleaning mat disposed on said bottom wall, proximate to said aperture, to clean the paws of an animal as it exits the enclosed space; and
   g) at least one of said top, bottom, and peripheral walls being openable so as to permit access to said litter box.

8. A sanitary enclosure for an animal litter box comprising:
   a) a container portion having a floor area for holding a litter box;
   b) a cover portion closeable on said container portion;
   c) an opening in said container portion to permit an animal to enter and exit the aperture portion wherein the aperture is disposed in a horizontal plane and lies between spaced vertical side walls; and
   d) space adequate for placement of paw cleaning means disposed on said floor area of said container portion between said opening and said holding area for the litter box.

9. The sanitary enclosure for an animal litter box as claimed in claim 8 wherein the cover portion is hinged to container portion.

10. The sanitary enclosure for an animal litter box as claimed in claim 8 wherein the container portion includes spaced walls with the aperture formed therebetween.

11. The sanitary enclosure for an animal litter box as claimed in claim 8 wherein the paw cleaning means comprise a multiplicity of upstanding flexible bristles.

12. The sanitary enclosure for an animal litter box as claimed in claim 8 wherein the container portion and the cover portions are formed from flat panels.

13. The sanitary enclosure for an animal litter box as claimed in claim 8 wherein the container portion is molded as a unit.

14. The sanitary enclosure for an animal litter box as claimed in claim 8 wherein the container portion and the litter box are molded as a unit.

15. A sanitary enclosure for an animal litter box comprising:
   a) a bottom wall;
   b) a top wall;
   c) a plurality of peripheral walls between said top and bottom walls to form an enclosed space, said peripheral walls including first and second vertical walls spaced apart from each other to define a serpentine entranceway with an entrance/exit aperture lying in a horizontal plane which requires an animal to enter and exit the enclosure in a vertical direction;

d) means for accommodating a litter box on said bottom wall within said enclosed space;

e) means for accommodating a paw cleaning mat disposed on said bottom wall, proximate to said entranceway, to clean the paws of an animal as it traverses the enclosed space; and f) at least one of said top, bottom, and peripheral walls being openable so as to permit access to said litter box.

16. The sanitary enclosure for an animal litter box as claimed in Claim 15 wherein the entrance/exit aperture lies below the top wall of the enclosure.

* * * * *